United States Patent
Block et al.

(10) Patent No.: US 7,912,203 B2
(45) Date of Patent: Mar. 22, 2011

(54) METHOD AND APPARATUS FOR PROVIDING CALLED PARTY INFORMATION TO A COVERAGE POINT DURING SURVIVABLE PROCESSOR OPERATION

(75) Inventors: Frederick P. Block, Westminster, CO (US); Kurt H. Haserodt, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 1594 days.

(21) Appl. No.: 11/222,527

(22) Filed: Sep. 9, 2005

(65) Prior Publication Data

US 2007/0064910 A1    Mar. 22, 2007

(51) Int. Cl.
*H04M 7/00* (2006.01)
*H04M 3/42* (2006.01)

(52) U.S. Cl. ......... 379/221.01; 379/212.01; 379/214.01; 379/219; 379/220.01; 379/233

(58) Field of Classification Search .............. 379/221.01, 379/233, 219, 212.01, 214.01, 211.03, 201.01, 379/220.01, 211.02; 370/237
See application file for complete search history.

(56) References Cited

U.S. PATENT DOCUMENTS

| | | | |
|---|---|---|---|
| 7,457,249 B2 * | 11/2008 | Baldwin et al. | 370/237 |
| 7,564,793 B2 * | 7/2009 | Baldwin et al. | 370/237 |
| 2006/0002380 A1 | 1/2006 | Bollinger et al. | |

FOREIGN PATENT DOCUMENTS

| | | |
|---|---|---|
| EP | 1119144 | 7/2001 |
| JP | H06-268737 | 9/1994 |
| JP | H07-221838 | 8/1995 |
| JP | 2004-274393 | 9/2004 |
| JP | 2005-123730 | 5/2005 |
| WO | WO 2004/002116 | 12/2003 |
| WO | 2004/054346 | 7/2004 |
| WO | 2005/055488 | 6/2005 |

OTHER PUBLICATIONS

Search and Examination Report under Sections 17 & 18(3) for U.K. Patent Application No. GB0616894.2, mailed Dec. 15, 2009, 4 pages.
Search Report to U.K. Patent Application No. GB0616894.2, mailed Mar. 19, 2007.
Examiner's Office Letter (including translation) for Japanese Patent Application No. 2006-243524, mailed Mar. 30, 2009.
Background section of the above-captioned application (previously provided).
Examination Report for U.K. Patent Application No. GB0616894.2, mailed Jun. 1, 2009, 2 pages.
Decision to Grant Patent for Japanese Patent Application No. 2006-243524, mailed Sep. 16, 2009, pp. 1-3.
Background section of the above-captioned application (previously provided), submitted on Aug. 27, 2009.

* cited by examiner

*Primary Examiner* — Thjuan K Addy
(74) *Attorney, Agent, or Firm* — Sheridan Ross P.C.

(57) ABSTRACT

Called party information is provided during survivable processor mode operation of a branch included in a distributed private branch exchange communication system for support of features that require information identifying the called party. More particularly, a coverage path for use during survivable processor operation is enabled that establishes contact with an extension or coverage point over the public switched telephony network such that operation of system appears normal to a caller. Furthermore, for a given coverage point, the same coverage path can be used for a number of extensions, reducing administrative burden.

22 Claims, 4 Drawing Sheets

METHOD AND APPARATUS FOR PROVIDING CALLED PARTY INFORMATION TO A COVERAGE POINT DURING SURVIVABLE PROCESSOR OPERATION

FIELD

The present invention is directed to providing call coverage routines. In particular, embodiments of the present invention provide called party information to a coverage point while a branch system associated with a called extension is in survivable processor mode.

BACKGROUND

Voice telephony systems often provide call coverage for calls that are not answered by a called endpoint or extension. Furthermore, a telephony system will typically permit a sequence of alternate destinations or coverage points to be defined for each extension on the telephony system. The coverage paths are usually stored as instructions in a data base that is referenced when coverage for a call is required.

In a typical private branch exchange system (PBX), a number of communication endpoints, each having a unique extension, are associated with a communication server. Furthermore, a private branch exchange may include a number of subsystems that each include a communication server and a number of extensions. For example, in a typical implementation, a main or central system may be interconnected to one or more remote branch systems by a wide area network (WAN). Furthermore, various coverage operations may be provided to extensions associated with remote branches by the main system server or some other server that is accessed from remote branches over a wide area network connection. Examples of call coverage services provided by a central system include voice mail coverage.

During normal operation, coverage for an extension may be provided by forwarding the call across a local area network from a gateway or communication server that received the call, to the coverage point. In such a situation, the extension of the call communication endpoint is provided as part of the call coverage operation. However, when the gateway or communication server of the system receiving a call is unable to connect to the coverage point, for example due to a WAN outage, the call must be forwarded to the coverage point over an alternate path. Such an alternate path may be provided by the public switched telephony network (PSTN). However, routing a call to a coverage point across the PSTN is typically performed without providing the coverage point with an indication of the extension that was called. Accordingly, upon receiving a call requiring coverage from the PSTN, the coverage point must request information identifying the called extension from the calling party, for example by playing a recorded message requesting that the calling party re-enter the called extension. Furthermore, prior art solutions for implementing coverage paths do not easily accommodate coverage paths that are to be used only under particular circumstances, such as where a branch system is unable to connect to a main or central system over a WAN, and is therefore operating in a local survivable processor mode.

Another problem with distributed PBX systems having separate branches (or a branch and central system) that are connected by an Internet protocol network, such as a wide area network, that becomes unavailable relates to calls between extensions associated with different branches. In such a situation, calls between extensions in different branches (or between a branch and a central system) fail if the caller enters only the extension of the called number. Furthermore, in such situations, the caller will be unable to reach the called extension unless the caller knows the complete telephone number for the called party, in order to allow the call to be routed over the public switched telephony network.

PBX systems that allow coverage arrangements having multiple coverage points, including coverage points accessed across the PSTN, have been available. In order to forward a call across the PSTN for coverage with an identification of the called extension, those systems require that a coverage path including the telephone number of the coverage point and the extension of the called endpoint be coded for each extension. However, providing such a unique coverage path script for each extension in a system having a large number of extensions is impractical. Furthermore, many private branch exchange systems limit the number of coverage paths that may be administered, making the administration of a unique coverage path for each extension impossible. Even if the number of coverage paths that can be defined is unlimited, administering a unique coverage path for each extension would be an administrative burden.

SUMMARY

The present invention is directed to solving these and other problems and disadvantages of the prior art. In accordance with embodiments of the present invention, special characters are defined for use in connection with scripts establishing call coverage paths. More particularly, special characters that influence the coverage operation and/or the digits sent to a coverage point may be defined. Through the application of such special characters, a secondary coverage point for use when a network connection between a system associated with a called extension and a primary coverage point is unavailable can be created and used for multiple extensions, without requiring specific administration for each such extension. More particularly, the coverage path in accordance with embodiments of the present invention provides for the communication of an identification of the called extension to the coverage point, without requiring a unique coverage path script for each extension using that coverage point. In accordance with further embodiments of the present invention, a coverage path that results in a public switched telephony network (PSTN) trunk call from a branch system that is temporarily isolated due to the unavailability of a primary network connection can be defined that is only used when the branch system is so isolated.

In accordance with the embodiments of the present invention, a coverage path including special variable characters is provided. A first special character may indicate that the coverage path is only for use when the branch system receiving a call that requires coverage from a coverage point or a main system is isolated from the main system, and therefore a call across the PSTN is required in order to access the coverage point. The coverage path may next include a telephone number for the coverage point. After the telephone number, a second special character is included that signals the remote system to wait for the coverage point to answer the call before proceeding. A third special character may then be provided, that instructs the branch system to transmit the identifier for the called extension to the coverage point, after the coverage point has answered the call. Accordingly, where a number of communication endpoints or extensions associated with a branch use the same coverage point, a coverage path involving that coverage point can be defined using an identical script or coverage path for each of the extensions.

In accordance with further embodiments of the present invention, a call coverage routine scripted in accordance with embodiments of the present invention may be used in connection with providing at least limited dial plan transparency. In particular, when a primary network connection between a branch and a central system or another branch system is inoperable, a trunk call to a called party's direct inward dialing (DID) number can be placed automatically by executing a coverage path that contains special variable characters. In particular, any digits required for access to the PSTN and the area code and prefix of the DID for the called system followed by a special character indicating that the number of the called extension is to be entered, can be provided as a call coverage path script. In accordance with other embodiments of the present invention, where the branch system associated with the calling extension is in a survivable processor mode, a trunk call to a remote access number is generated in response to receiving digits comprising an extension on another branch. After the communication server associated with the called extension has answered the trunk call, the called party's extension number is automatically provided. Accordingly, calls between branches can be completed even if primary network connections are inoperable, without requiring that the caller enter the complete DID number for the called party, and without requiring a unique coverage script for each extension in each branch.

Additional features and advantages of embodiments of the present invention will become more readily apparent from the following discussion, particularly when taken together with the accompanying drawings.

DETAILED DESCRIPTION

The present invention is directed to providing at least partial dial plan transparency and/or to facilitating call coverage in connection with distributed private branch exchange systems during survivable processor operation. As used herein, survivable processor operation occurs when a primary network connection between a branch system of a distributed private branch exchange system and another branch system or a central system is inoperable.

Figure 1:
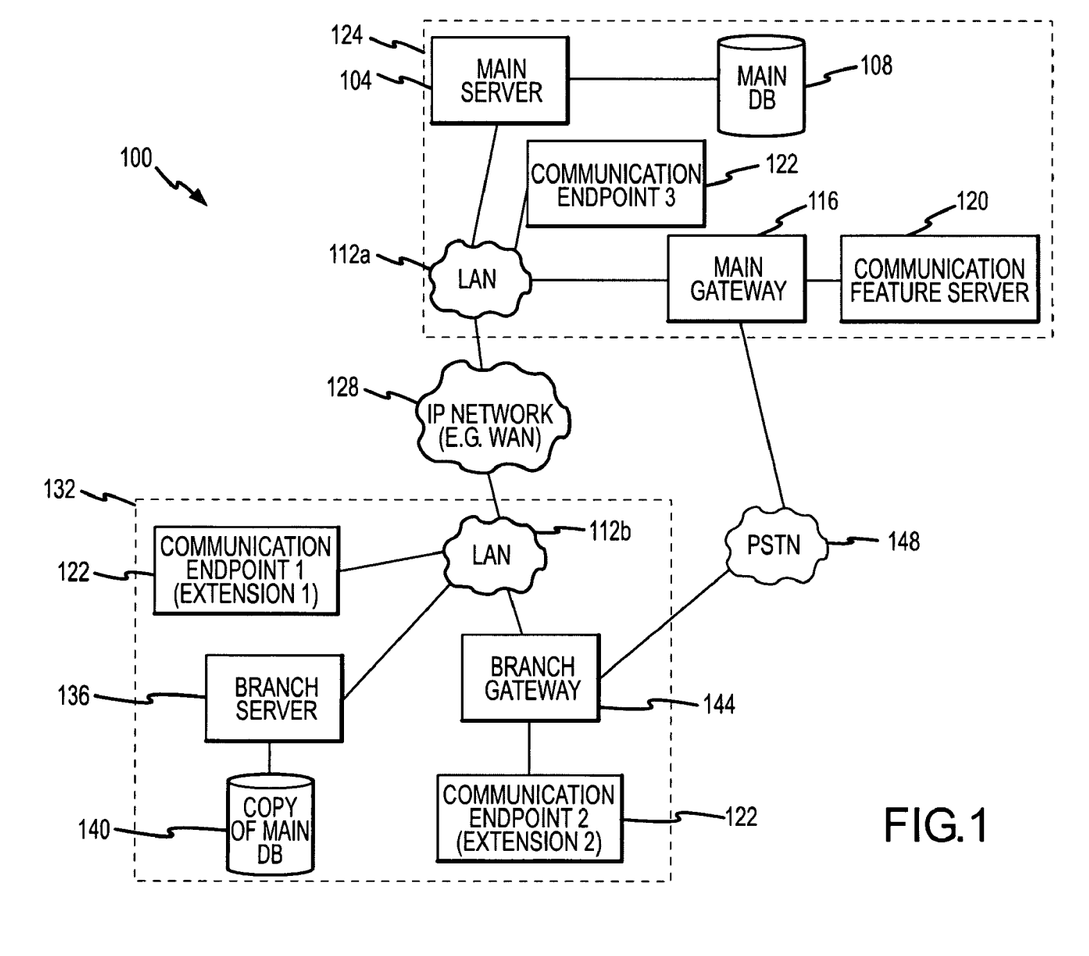
FIG. 1 is a block diagram depicting components of a system in accordance with embodiments of the present invention.

With reference to FIG. 1, components of a distributed private branch exchange (PBX) system 100 in accordance with embodiments of the present invention are shown in block diagram form. In particular, the distributed PBX system 100 includes a main server 104 associated with a main database 108. The main server 104 and associated main database 108 are interconnected to a first local area network 112a. The first local area network 112a is additionally interconnected to a gateway 116 that may incorporate or be interconnected to a communication feature server 120, such as a voice mail server. Alternatively, a communication feature server 120 may be directly interconnected to the first local area network 112a. Together, the main server 104, main database 108, first local area network 112a, gateway 116 and communication feature server 120 comprise a main or central system or region 124. The main or central system 124 is part of a distributed private branch exchange (PBX). Accordingly, the main system 124 may be interconnected to a branch system or region 132 by a first or primary network connection 128, such as a wide area network. Furthermore, as used herein a main system 124 may comprise all the attributes of a branch system 132, and therefore comprises a special type of branch system 132, with additional features, such as a central communication feature server 120.

The branch system 132 may include a remote branch server 136 that includes or is associated with a copy of the main database 140. The main database 108 and/or the copy of the main database 140 may comprise menus for storing call coverage information. The branch system 132 may additionally comprise a second local area network 112b for interconnecting various components included in the branch system 132. The branch system 132 may also include a gateway 144 and a number of communication endpoints 122. The communication endpoints 122 may be directly connected to the local area network 112b, or to the local area network 112b through other components, such as through the branch gateway 144.

The main server 104 and remote branch server 136 generally function to provide telephony features for and control of components associated with their respective systems 124, 132. Accordingly, a main server 104 or branch server 136 can comprise means for controlling aspects of the operation of means for communicating. The functions performed by the main server 104 or branch server 136 can include call coverage operations. Call coverage operations generally take effect when an extension comprising or associated with a communication endpoint 122 or a feature provided by a communication feature server 120 does not answer a call. In addition, in accordance with embodiments of the present invention, call coverage functions can be applied to connect a caller dialing from an extension 122 within the system 100 to another extension 122 within the distributed PBX system 100 even if a primary network 128 (e.g. wide area network) connectivity is unavailable, and without requiring the caller to manually enter the complete telephone number of the called extension in order to route that extension across the PSTN 148. In accordance with embodiments of the present invention, the main server 104 and branch server 136 may comprise private branch exchange or communication servers.

The main data base 108 associated with the main server 104 generally functions as a central repository for information related to the distributed PBX system 100. Such information may include system extensions and direct inward dialing (DID) numbers for communication endpoints 122 associated with the distributed PBX system 100. In addition, the main data base 108 may function as a central repository for coverage paths associated with communication endpoints 122 or telephony features and that are included in the distributed PBX system 100. In accordance with embodiments of the present invention, a coverage path defined for a communication endpoint 122 associated with a branch system 132 will include at least a first call coverage routine or path for use during normal operation of the distributed PBX system 100 and a second call coverage routine or path for use where the primary network connection between the branch system 132 and the main system 124 is inoperable.

The main gateway 116 and branch gateway 144 generally interconnect their associated region or system 124 or 132 to the PSTN 148. Therefore, a gateway 116, 144 may comprise a means for interconnecting to a second communication network means. For example, each gateway 116, 144 may interconnect to the PSTN 148 via a trunk line. As a result, calls from outside the distributed PBX system 100 can be placed to extension associated with the main system 124 through the main gateway 116 or to extensions associated with the branch system 132 through the branch gateway 144. In addition, via the gateways 116, 144, calls can be placed between the main 124 and branch 132 systems across the PSTN 148. Network devices, such as communication feature servers 120 and communication endpoints 122, can also sit off or be associated with a gateway 116, 144. Furthermore, while the functions of a gateway 116, 144 are typically considered separately from the functions of other devices within a region, a physical switch or server implementing a gateway 116, 144 may also implement other devices, such as a main server 104, remote branch server 136 and/or communication feature server 120.

A communication feature server 120 can provide features or services in connection with the system 100. For example, a communication feature server 120 may comprise a voice mail server, interactive voice response (IVR) server, and/or a customer relationship management (CRM) server. Accordingly a communication feature server may comprise a means for providing communication features.

A communication endpoint 122 is generally associated with an extension. For example, an extension can identify each communication endpoint 122 within the distributed PBX system 100 comprising the main system 124 and all of the branch systems 132. A communication endpoint or means for communicating 122 may comprise a telephone, an Internet protocol telephone, a soft telephone implemented in connection with a general purpose computer, a portable computing and/or communication device, such as a personal digital assistant, or any other wire line or wireless device associated with an extension within the main system 124 or branch system 132 of a distributed PBX system 100.

During normal operation, calls received at the main system 124 or the branch system 132 that are directed to a communication endpoint 122 have access to a communication feature server 120 operating within the main branch 124 for coverage operations. Furthermore, when an incoming call is received at a branch gateway 144 for a communication endpoint 122 associated with a branch system 132, the communication feature server 120 may be accessed across a primary network or first communication network means 128 Internet protocol connection between the main system 124 and the branch system 132. Such operations may include coverage operations that are implemented if the communication endpoint 122 is not answered by a user. In general, coverage paths for communication endpoints 122 are stored in the main database 108, with copies of the main database 140 distributed to each branch system 132. This communication may be formed through means for interconnecting comprising a connection between a node on the LAN 112 and the first network 128.

If the primary network 128 connection between the main system 124 and the branch system 132 is severed or inoperable, the branch system 132, and in particular the branch server 136, operates in survivable processor mode. In survivable processor mode, the branch server 136 controls functions associated with the branch system 132. Because the branch server 136 has access to a copy of the main database 140, most of the functions of the system 100 can operate normally. However, because there is typically only one communication feature server 120 provided as part of the main system 124 for certain features, calls that require coverage from that communication feature server 120 must be routed from the branch system 132 to the main system 124 over the PSTN 148 when the IP protocol link is inoperative. In prior art systems, routing a call across the PSTN 148 to access a coverage point comprising a voice mail server or other feature that depended on or could benefit from an identification of the called communication endpoint 122 would result in a request to the calling party to provide an identification of the called communication endpoint 122. For example, when the communication feature server 120 provides a voice mail function, the calling party would have to normally enter the extension of the communication endpoint 122 that was being called in order to access the voice mailbox for that extension. After being provided with the identification information, the communication feature server 120 could then play back a personalized greeting associated with the called communication endpoint 122. As described herein, embodiments of the present invention provide for the delivery of information identifying a called communication endpoint 122 without requiring manual input from a caller, and without requiring the administration of a unique coverage path for each communication endpoint 122 using a communication feature server 120 or other component or node that requires information identifying the called extension as a coverage point.

Figure 2:
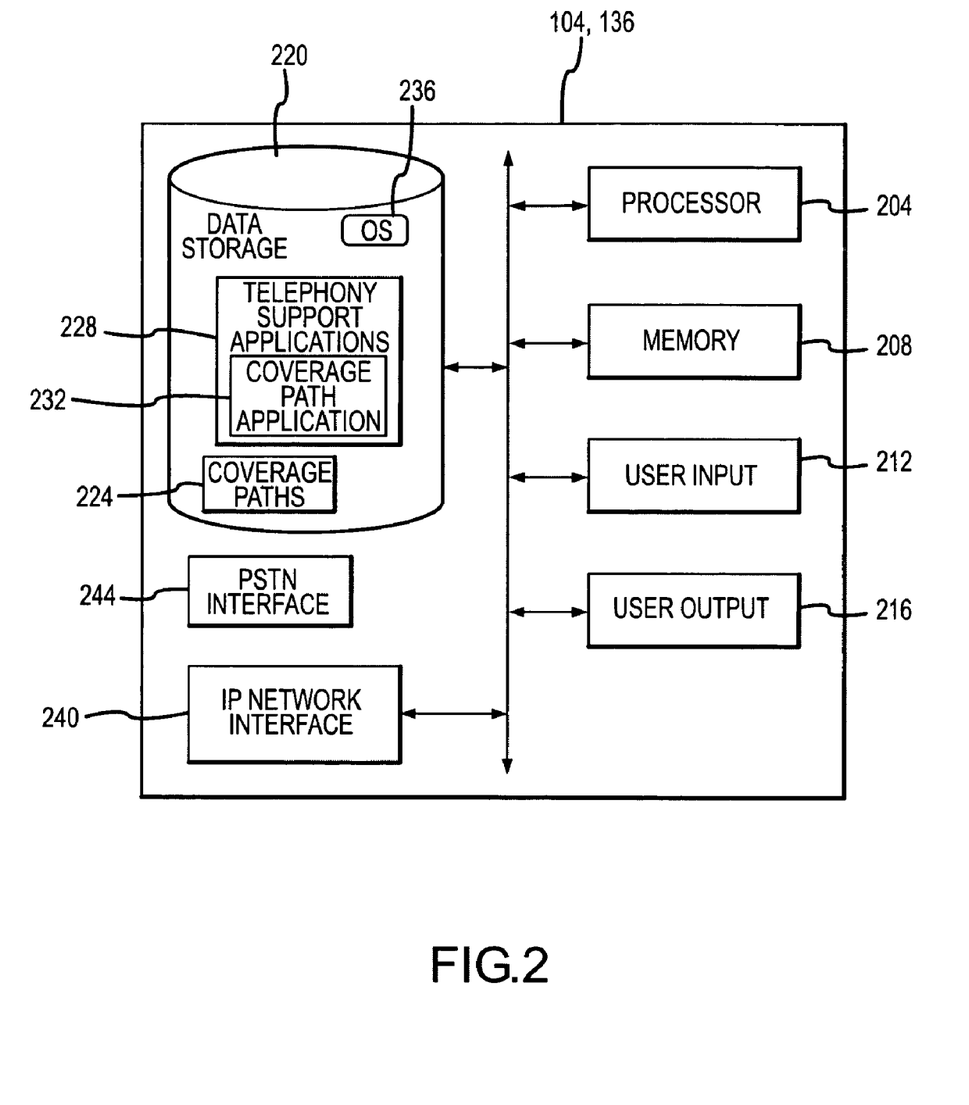
FIG. 2 is a block diagram depicting components of a communication server in accordance with embodiments of the present invention.

With reference now to FIG. 2, the components of a main server 104 or a remote branch server 136 implementing some or all of the coverage path application features described herein in accordance with embodiments of the present invention are depicted in block diagram form. The components may include a processor 204 capable of executing program instructions. Accordingly, the processor 204 may include any general purpose programmable processor, digital signal processor (DSP) or controller for executing application programming. Alternatively, the processor 204 may comprise a specially configured application specific integrated circuit (ASIC). A processor 204 generally functions to run programming code implementing various functions performed by the server 104, 136, including telephony support applications and coverage path applications as described herein.

A server 104, 136 may additionally include memory 208 for use in connection with the execution of programming by the processor 204 and for the temporary or long-term storage of data or program instructions. The memory 208 may comprise solid state memory resident, removable or remote in nature, such as DRAM and SDRAM. Where the processor 204 comprises a controller, the memory 208 may be integral to the processor 204.

In addition, the server 104, 136 may include one or more user inputs or means for receiving user input 212 and one or more user outputs or means for outputting 216. Examples of user inputs 212 include keyboards, keypads, touch screens, touch pads and microphones. Examples of user outputs 216 include speakers, display screens (including touch screen displays) and indicator lights. Furthermore, it can be appreciated by one of skill in the art that the user input 212 may be combined or operated in conjunction with the user output 216. An example of such an integrated user input 212 and user output 216 is a touch screen display that can both present visual information to a user and receive input selections from the user. In accordance with embodiments of the present inventions, a user input 212 and user output 216 associated with the server 104, 136 may be used by an administrator in connection with creating or loading coverage path instructions and other information related to the operation of a private branch exchange main system 124 or branch system 132.

A server 104, 132 may also include data storage 220 for the storage of application programming and/or data. Furthermore, in accordance with embodiments of the present invention, the data storage 220 may, in the case of a main server 104, comprise all or part of the main database 108, and in connection with a branch server 136, the data storage 220 may comprise all or part of that branch system's 132 copy of the main database 140. Accordingly, the data storage 220 may store coverage paths 224 for communication endpoints 122 or other addressable devices included in a distributed PBX system 100 in accordance with embodiments of the present invention. In addition, various telephony support applications 228, such as a coverage path application 232 may be stored in data storage 228. Operating system software 236 may also be stored in the data storage 220. The date storage 220 may comprise, for example, a magnetic storage device, a solid state storage device, an optical storage device, a logic circuit, or any combination of any such devices. It should further be appreciated that the programs and data that may be maintained in the data storage 220 can comprise software, firmware, or hardware logic, depending on the particular implementation of the data storage 220.

A server 104, 136 may also include an Internet protocol (IP) network interface 240. An example of an IP interface 240 is a network interface card (NIC). In connection with a server 104, 136 that also implements a gateway 116, 144, a public switched telephony network (PSTN) interface 244 may also be provided.

Figure 3:
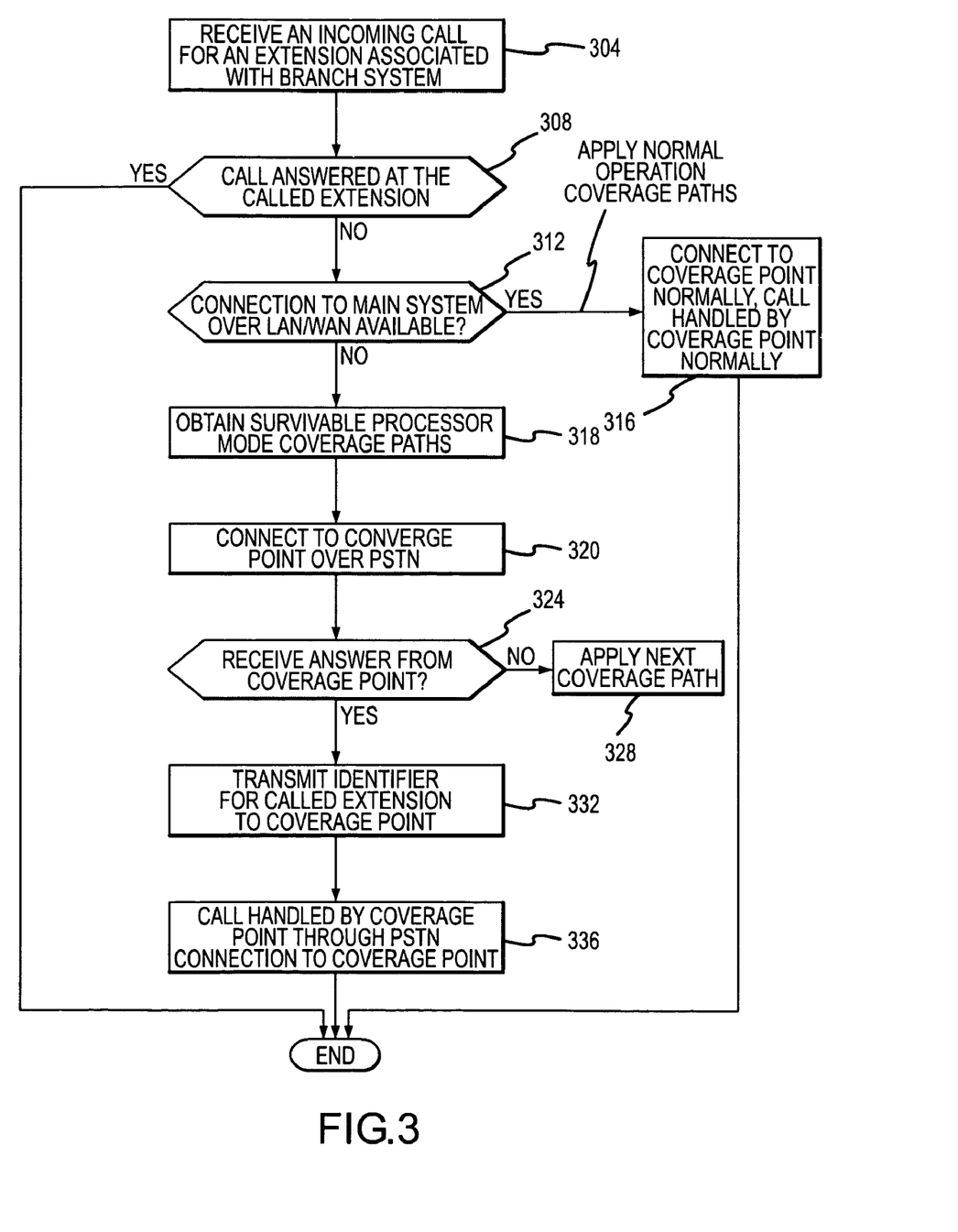
FIG. 3 is a flow chart illustrating aspects of the operation of a system in accordance with embodiments of the present invention.

With reference now to FIG. 3, aspects of the operation of a private branch exchange 100 in accordance with embodiments of the present invention are illustrated. Initially, at step 304, an incoming call is received that is directed to an extension associated with a branch system 132. For example, a call may be received from the PSTN 148 at the branch gateway 144.

A determination may then be made as to whether the incoming call has been answered at the called extension (step 308). If the call is answered, the process may end. If the call is not answered at the called extension, the branch server 136 may access a coverage path for the called extension to determine where to direct the call.

As part of determining how to route the incoming call, the branch server 136 may determine whether it is operating in survivable processor mode. In particular, embodiments of the present invention provide different coverage paths depending on whether the private branch exchange system 100 is operating normally, or whether a branch system 132 receiving a call requiring coverage is not connected to the main system 124 by the primary network 128, and therefore is operating in survivable processor mode (step 312). If the primary network 128 connection interconnecting the main system 124 to the remote system 132 is available, the branch server 136 will apply coverage paths specified for normal operation in sequence, until coverage for the call is obtained. In so doing, the call may be routed from the branch system 132 to a coverage point, such as a communication feature server 120 (e.g. a voice mail server) associated with the main system 124 normally, across the primary network 128 connection, and the communication feature server 120 can handle the call normally (step 316). In particular, information regarding the called extension can be passed across the primary network 128 connection to the communication feature server 120, allowing the communication feature server 120 to play back a personalized greeting associated with the called extension or otherwise apply features or messages associated with the called extension. After connecting the call to a coverage point across the primary network connection 128, the process may end. If it is determined at step 312 that the branch system 132 is operating in survivable processor mode, then those coverage paths indicated as being for use while the branch system 132 is in survivable processor mode are applied (step 318).

In general, because survivable processor mode is entered while a primary network 128 connection between the branch system 132 and the main system 124 is inoperable, coverage paths applied while in such a mode involve calls placed across the PSTN 148. Accordingly, applying a survivable processor mode coverage path involves connecting to a coverage point over the PSTN 148 (step 320). Connecting to a coverage point over the PSTN generally comprises dialing the complete direct inward dialing (DID) number for the coverage point from the branch gateway 144, to establish a connection with a coverage point, such as a communication feature server 120 or another extension 122 through the PSTN 143 and the main gateway 116. At step 324, a determination is made as to whether an answer has been received from the coverage point. In general, the branch server 136 will wait for at least a predetermined period of time for the coverage point to answer. If no answer is received after that predetermined period of time has elapsed, a next coverage path may be applied (step 328), if available.

After receiving an answer from a coverage point at step 324, the branch server 136 transmits the identifier for the called extension (e.g. the extension associated with the called endpoint 122) to the coverage point (step 332). The call is then handled by the coverage point through the PSTN 148 connection as if the call had been forwarded to the coverage point across the primary network 128 connection (step 336). That is, by providing the called extension to the coverage point automatically, embodiments of the present invention allow calls sent to coverage during survivable processor operation to appear to the calling party as if they were handled normally. In addition, the present invention permits such apparently seamless handling of calls sent to coverage during survivable processor operation, without requiring the creation of a unique call coverage path for each extension associated with a branch system 132.

In particular, special characters are defined that permit a single coverage path script to be used in connection with any number of extensions in a branch system 132 and a common coverage point, such as a communication feature server 120 associated with the main system 124, while the branch system 132 is in survivable processor mode. These characters may include an initial character that indicates to a coverage path application 232 running on the branch server 136 that the coverage path is only for use during survivable processor operation. Providing this indication prevents the branch server 136 from placing calls across the PSTN 148 when the IP network connection 128 is available. Next, the script may include the direct inward dialing (DID) number for the target coverage point. The direct inward dialing number may be pre-pended by any digits necessary to successfully dial across the PSTN 148 between the branch system 132 and the main system 124. For example, the number may include a nine, to indicate to the branch gateway 144 that the call is to be placed across the PSTN 148. In addition, the DID number of the target coverage point may be pre-pended by a one if the call across the PSTN 148 is long distance. The remainder of the number will typically be the 10 digit telephone number for the coverage point. After the digits required to access the coverage point across the PSTN 148, the coverage path script may include a special character to indicate that the branch server 136 should wait for an answer from the target coverage point before continuing with execution of the script. Finally, another special character may be included that instructs the branch server 136 to transmit the called extension number to the coverage point across the PSTN 148.

Accordingly, an example of a called coverage path script for use during survivable processor operation is as follows: L912225387999% D, where L is the special character indicating that the coverage path script is for application only during survivable processor operation, the following number is comprised of any digits that must be dialed in order to access the target coverage point across the PSTN 148, the percent symbol directs the branch system server 136 to wait for a response from the target coverage point before executing the remainder of the script, and D is the special character directing the branch system server 136 to provide the called extension number to the coverage point after the coverage point has answered the call. The particular characters chosen to operate as special characters as described herein can generally be any character not already assigned to other functions that can be executed as part of a coverage path script. In accordance with embodiments of the present invention, the special characters chosen for a particular purpose may serve a mnemonic function. For example, the choice of L can suggest Local survivable processor operation, while the choice of D can suggest the calleD party extension.

Each extension that shares a coverage point can share the same coverage path script for use during survivable processor operation. Furthermore, by the use of special characters as described herein, the coverage path for use during survivable processor operation provides for the identification of the called extension to the coverage point, allowing the coverage point to respond as appropriate for the called extension. Furthermore, the identification of the called extension to the coverage point is accomplished without requiring manual input from a calling party. In addition, the use of special characters as described herein in the coverage path avoids the need to administer a unique coverage path script for use during survivable processor operation for each extension.

Although certain examples provided in the present description have discussed transferring a call placed to an extension that does not answer to a coverage point comprising a communication feature server 120, such as a voice mail server, even during survivable processor operation, embodiments of the present invention are not so limited. For instance, dial plan transparency can be provided for calls between extensions or within a branch system. For example, dial plan transparency or PSTN coverage can be provided for calls between extensions on the same branch system 132, or between a branch system 132 and the main system 124. More particularly, rather than dialing a coverage point, a remote access number for the called extension's system 124, 132 can be dialed as directed by a call coverage path. After an answer is received, a special character in the call coverage path signals the calling branch server 136 to provide the extension number of the called extension, allowing the call to be completed, without requiring that the calling user enter (or re-enter) the called extension and without requiring a unique script for each extension accessible through a common remote access number.

Figure 4:
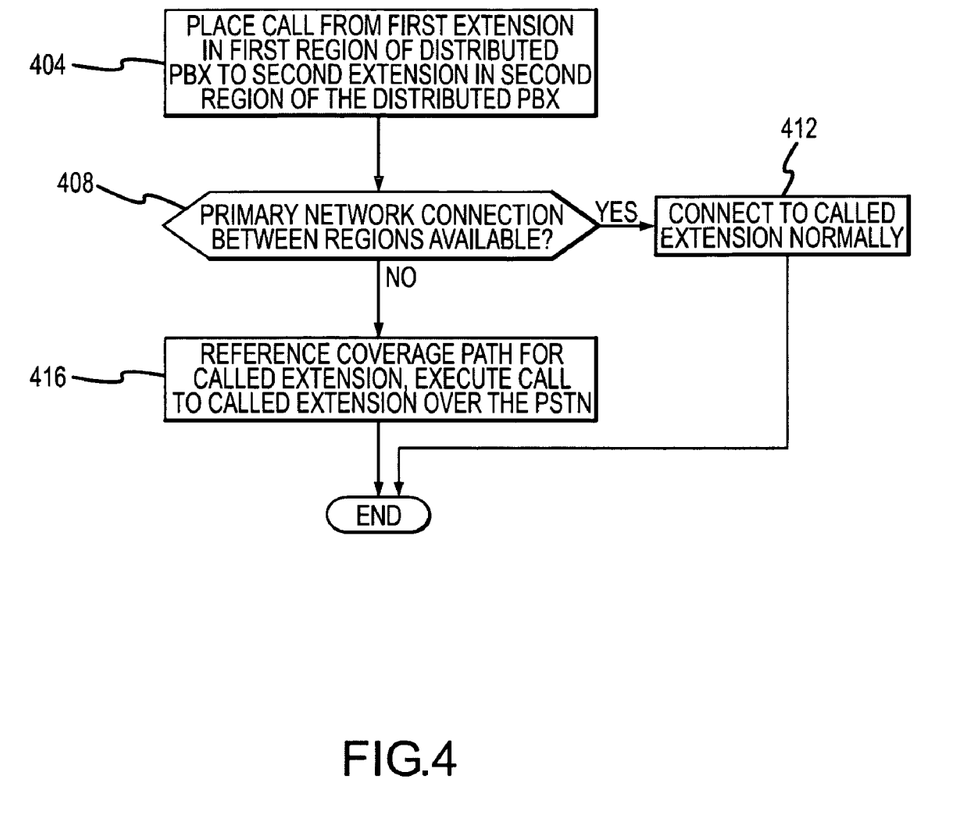
FIG. 4 is a flow chart illustrating other aspects of the operation of a system in accordance with embodiments of the present invention.

With reference to FIG. 4, other aspects of the operation of a distributed private branch exchange system 100 in accordance with embodiments of the present invention are illustrated. In step 400, a call is placed from a first extension in a first region 132 of a distributed private branch exchange system 100 to a second extension in a second region 124 of the distributed private branch exchange system 100. At step 408, a determination is made as to whether the primary network 128 connection between the regions 124, 132 is available. If the connection across the primary network 128 between the regions 124, 132 is available, a connection between the first and second extensions is established normally (step 412). That is, by entering only those digits of the called extension, the call can be established.

If the primary network 128 connection between the regions 124, 132 is not available, the coverage path for the called extension is referenced, and a call to the called extension is executed over the PSTN 148 (step 416). That is, the coverage path for the called extension comprises a script that results in a call being placed between the regions 124, 132 using the 10-digit number of the called extension. Furthermore, the call across the PSTN 148 is accomplished without requiring manual input from the calling party. Instead, the 10-digit number is dialed in response to the coverage path script. Furthermore, the coverage path script can include any initial digits that must be dialed, such as a "9" indicating that the call is to be placed across the PSTN 148, and a "1" if the call across the PSTN 148 is long-distance, and the area code for extensions associated with the called region. The prefix (e.g., 2 or 3 digits) for extensions associated with the called region can then be specified by the path, followed by a special character signaling that the called extension (e.g., 4 or 5 digits) should be dialed. Accordingly, as can be appreciated by one of skill in the art from the description provided herein, the same coverage path script can be used for every extension in a region 124, 132 of a distributed private branch exchange system 100 having the same area code and prefix. As a result, a call between extensions in different regions 124, 132 can appear as if it was completed normally, even during an outage of the network connection 128 that is normally used, without requiring the administration of a unique coverage path script for each extension in the distributed PBX system 100.

In accordance with embodiments of the present invention, individual extensions may be associated with a number of coverage paths. For example, a typical extension may have three coverage paths: (1) a coverage path that causes the DID number of the called extension to be dialed for use during an outage of the primary network 128 connection between regions for calls placed to an extension from an extension associated with another region of the distributed PBX system 100; (2) a path to a communication feature server 120 comprising a voice mail server for use during normal operation; and (3) a path used during an outage of the primary network 128 between a branch region 132 and the main region 124 that places a call across the PSTN 148 to the server 120 and that automatically provides the called extension to the server 120. In accordance with embodiments of the present invention, where all three of these example coverage paths are provided, the first coverage path script need not be executed in connection with an extension associated with a branch 132 if the branch server 136, or if the branch server 136 recognizes that the called extension is part of the branch server's 136 region 132. In accordance with still other embodiments of the present invention, an additional special character may be defined to distinguish between coverage path scripts that are to be executed when the primary network 128 connection is unavailable and a call needs to be forwarded to a coverage point across the PSTN 148, and coverage path scripts that are to be executed when the primary network 128 connection is unavailable and a call must be placed across the PSTN 148 in order to establish a connection between extensions in different branches 124, 132 of the distributed PBX system 100.

Although exemplary embodiments of the present invention have been discussed in the context of a central or main region 124 in association with a single branch region 132, it should be appreciated that other arrangements can be provided. For example, a distributed PBX system 100 can comprise a number of branch regions 132. In addition, although examples have described a primary network 128 as comprising a wide area network, connections between regions 124, 132 can be by other means. For example, any type of Internet protocol network or combination of networks may comprise a primary network 128.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application use of the invention. It is intended that the impended claims be construed to include alternative embodiments to the extent permitted by the prior art.

What is claimed is:

1. A method for providing call coverage, comprising:
   detecting at a first branch system a first call to a first extension, wherein in a normal operating mode said first branch system is interconnected to a second branch system by a first network and by a second network;
   determining that said first call cannot be completed;
   in response to determining that a connection between said first branch system and one of said first extension and a coverage point over said first network is inoperable, wherein said first branch system is in survivable mode, retrieving a first call coverage path script for use while said first branch system is in said survivable mode;
   executing said first call coverage path script containing at least a first special character, wherein said method further comprises one of:
   1) in response to determining that said first extension is included in a second branch system and in response to said first special character, dialing a direct inward dialing number for said first extension, wherein said first call is routed to said second branch system over said second network;
   2) in response to determining that said first extension is included in said first branch system, dialing a direct inward dialing number for said coverage point and providing an identification of said first extension to said coverage point over said second network in response to said first special character.

2. The method of claim 1, wherein said second network comprises a public switched telephony network.

3. The method of claim 1, wherein said first extension is included in said first branch system.

4. The method of claim 3, wherein said first call coverage path script further includes a second special character, and wherein said executing said first call coverage path further includes:
   after said dialing said direct inward dialing number for said coverage point and in response to said second special character, waiting for a response from said coverage point; and
   after receiving a response from said coverage point providing an identification of said first extension to said coverage point over said second network in response to said first special character.

5. The method of claim 4, further comprising:
   receiving a second incoming call for a second extension included in said first branch system;
   determining that said second incoming call should go to coverage;
   in response to determining that a connection between said first branch system and said coverage point over said first network is inoperable, wherein said first branch system is in survivable mode, retrieving a first call coverage path script for said second extension, wherein said first call coverage path script for said second extension is identical to said first call coverage path script for said first extension;
   executing said first call coverage path script, wherein said executing comprises:
   sending said second incoming call for said second extension from said first branch system to said coverage point over said second network;
   waiting for said coverage point to answer said first branch system over said public switched telephony network;
   after receiving an answer from said coverage point at said first branch system, sending an identifier for said second extension from said first branch system to said coverage point over said second network, wherein said identifier is sent in response to said at least a first special character included in said first call coverage path for said second extension.

6. The method of claim 5, wherein said first call coverage path for said first extension is a first instance of said first call coverage path, and wherein said first call coverage path for said second extension is a second instance of said first call coverage path.

7. The method of claim 4, wherein said second network comprises a public switched telephony network, wherein first call coverage path includes a telephone number identifying said coverage point and said at least a first variable character, and wherein said at least a first variable character instructs said first branch system to provide said identifier for said first extension.

8. The method of claim 7, wherein said identifier comprises an extension number of said extension to which an incoming call is directed.

9. The method of claim 4, further comprising:
   in response to receiving said first extension identifier, said coverage point playing a greeting associated with said first extension.

10. The method of claim 9, wherein said greeting associated with said first extension is a recorded greeting provided in connection with a voice mail function performed by said coverage point.

11. The method of claim 9, wherein said greeting associated with said first extension is a first greeting provided in connection with an interactive voice response function performed by said coverage point that is selected by said coverage point with reference to said first extension identifier.

12. The method of claim 2, further comprising:
   in response to receiving said identifier for said first extension, said coverage point playing a greeting associated with said first extension over said first network connection as part of said first communication;
   in response to receiving said identifier for a second extension, said coverage point playing a greeting associated with said second extension.

13. The method of claim 1, wherein said first call coverage path script further includes a third special character, wherein said third special character identifies as first call coverage path script as being applicable while said first branch system is in survivable processor mode.

14. The method of claim 1, wherein first extension is included in a second branch system, wherein said dialing a direct inward dialing number for said first extension comprises dialing numbers in said script and then dialing a first extension identifier in response to said first special character.

15. The method of claim 1, wherein first network connection comprises a wide area network connection.

16. A system for providing call coverage, comprising:
a first communication network;
a second communication network, wherein said second communication network includes a public switched telephony network;
a branch system, wherein said branch system is interconnected to first and second communication networks, said branch system including:
   a branch system server;
   a number of communication endpoints interconnected to said branch system server, wherein each of said communication endpoints is associated with an identifier;
a main system interconnected to said branch system through said first and second communication networks, said main system including:
   a main system server;
   a communication feature server;
   a number of communication endpoints interconnected to said main system server, wherein each of said communication endpoints is associated with an identifier;
data storage, wherein call coverage routines include normal mode call coverage routines and survivable mode call coverage routines comprising instructions for routing a call placed to a called communication endpoint to one of a called extension and a coverage point for at least some of said communication endpoints are stored, and wherein said survivable mode call coverage routines include a telephone number identifying said main system on said public switched telephony network and at least a first special character;
   wherein in said normal mode of operation in response to a call received at said branch system addressed to a first one of said communication endpoints that requires a connection between said branch system and said main system in order to connect to one of: 1) said first communication endpoint, and 2) a coverage point, said connection is established over said first communication network;
   wherein in said survivable mode of operation, in response to a call received at said branch system addressed to a first one of said communication endpoints that requires a connection between said branch system and said main system in order to connect to one of: 1) said first communication endpoint, and 2) a coverage point, said connection is established over said second communication network according to said instructions for routing a call, and wherein in response to said at least a first special character information identifying said one of said communication endpoints to which said first call is addressed is provided to said main system after a communication channel between said branch system and said main system is established.

17. The system of claim 16, wherein said branch system server and said number of communication endpoints comprise at least part of a local area network.

18. The system of claim 16, further comprising:
a first local area network interconnecting said branch system server and said number of communication endpoints of said branch system;
a second local area network interconnecting said main system server and said number of communication endpoints of said main system.

19. The system of claim 16, wherein said first communication network includes a wide are network.

20. The system of claim 16, wherein said data storage includes a main database associated with said main system and a copy of said main database associated with said branch system.

21. The system of claim 16, wherein communication feature server of said main system includes a voice mail server.

22. A system for directing calls in a distributed communication system, comprising:
first communication network means;
second communication network means;
a first system, including:
   means for communicating;
   means for providing communication features;
   means for interconnecting said first system to said first communication network means;
   means for interconnecting said first system of said second communication network means;
a second system, including:
   means for communicating;
   means for controlling aspects of the operation of said number of means for communicating;
   means for storing call coverage information associated with at least some of said means for communicating for execution by said means for controlling aspects of the operation of said number of means for communicating;
   means for interconnecting said second system to said first communication network means, wherein in a first operating mode said first and second systems are capable of communicating with one another using said first communication network means;
   means for interconnecting said second system of said second communication network means, wherein in a second operating mode said first and second systems are not capable of communicating with one another using said first communication network means but are capable of communicating with one another using said second communication network means;
wherein call coverage routines for at least some of said means for communicating comprise at least one of:
1) a call coverage script including: a) a telephone number associated with said means for providing communication features of said first system, wherein said telephone number allows a call requiring coverage to be directed to said means for providing call coverage over said second communication network means; and b) a special character, wherein said special character instructs said means for controlling to provide an identifier of a one of said means for communicating to which said call requiring coverage was directed; and
2) a call coverage script including: a) a partial telephone number associated with a first means for communicating of said first system; and b) a special character, wherein said special character instructs said means for controlling to complete said partial telephone number using an extension of said first means for communicating of said first system.

* * * * *